June 6, 1967  V. C. VANDERBILT, JR  3,323,807
PISTON RING
Filed April 27, 1964

INVENTOR.
VERN C. VANDERBILT JR.
BY
ATTORNEYS 3,323,807
PISTON RING
Vern C. Vanderbilt, Jr., Hagerstown, Ind., assignor, by mesne assignments, to Dana Corporation, Toledo, Ohio, a corporation of Virginia
Filed Apr. 27, 1964, Ser. No. 362,654
5 Claims. (Cl. 277—140)

This invention relates to piston rings in general and more particularly to an oil ring assembly wherein a component of the assembly is coated with polytetrafluoroethylene to reduce sliding friction between the components, reduce squeaking of the assembly and to inhibit the deposition of carbonaceous materials on the piston ring which tend to unitize the assembly and render it inoperative.

In modern reciprocating internal combustion engines, the compression ratio, high vacuum operating conditions and the speed of operation are constantly increasing. These conditions have brought about an increased use of oil control rings of the multiple component-assembled type to insure proper oil control operating characteristics. One common type of multiple component oil ring is comprised of a pair of axially spaced rails and a spacer-expander disposed therebetween; the latter axially spacing the rails and including radially inwardly and axially outwardly extending angular shoulders which engage the inner periphery of the rails to force them axially into engagement with the walls of the piston ring groove and radially into engagement with the cylinder wall. This spacer-expander is provided with wide radially extending slots for improved oil drainage while the narrow rails have high unit pressure engagement with the cylinder wall, and, because of their low weight, have reduced inertial forces acting thereon which reduces ring flutter. Additionally, because of the reduced size of the rails and the uniform radial pressure thereon by the spacer-expander, the narrow rails provide excellent ring conformability with the cylinder.

It is an object of this invention to improve the conformability of multiple component type oil rings by decreasing the friction between the components thereof, which decrease in friction additionally increases the wear life of the components.

Since the pistons of modern engines reciprocate at relatively high speeds, it is of utmost necessity that the piston rings conform extremely rapidly to changes in radial size and shape of the cylinder along the axial length thereof. By reducing the friction between the ring components, the conforming thereof is facilitated, and, since friction between the components is reduced, the wear life is extended.

It is another object of this invention to reduce the squeaking of piston rings as they move relative to the piston ring groove and conform to the cylinder wall. This is accomplished by utilizing friction reducing materials as a resilient spacer between the components so that the oil control piston ring securely fits the piston ring groove. Since flutter and vibration of the rails causes squeaking by resiliently fitting the oil ring in the groove, the vibration and flutter are reduced so that the squeaking is eliminated or at least reduced to a level which is not objectionable.

It is yet another object of this invention to provide a novel spacer-expander for a multiple component piston ring wherein the spacer-expander is coated with polytetrafluoroethylene, which coating reduces friction and wear between the spacer-expander and the rails and additionally, the coating by its characteristics that inhibit other materials from sticking to it, inhibits the deposition of carbonaceous material on the spacer-expander which would tend to clog the oil drainage capacity thereof and unitize the component so as to make the ring inoperative. The carbonaceous materials are present in the area of the piston rings and if they contact the usual uncoated ring components, tend to adhere thereto and ultimately build up to an objectionable degree.

Other and further objects of this invention will become apparent upon a consideration of the specification in view of the drawings wherein.

The above objects and advantages are attained by a preferred embodiment of this invention wherein a multiple component piston ring comprises a pair of axially spaced annular cylinder engaging rails having an annular circumferentially compressible and expansible spacer-expander disposed therebetween which spaces the rails and urges the latter axially outward against the walls of the piston groove containing the same and radially outwardly into an engaging and conforming relationship with a cylinder containing the same. The spacer-expander includes angularly disposed radially inwardly and axially outwardly extending shoulders which engage the inner periphery of the rails thereby urging the rails axially and radially outwardly. In order to reduce the friction between the rails and the spacer-expander, to reduce squeaking by resiliently spacing the rails, and to eliminate the build-up of carbonaceous material on the spacer-expander, the spacer-expander is provided with a coating of polytetrafluoroethylene, which, because of its low coefficient of friction, non-adhering and hard, yet resilient characteristics, accomplishes the desired result.

Figure 1:
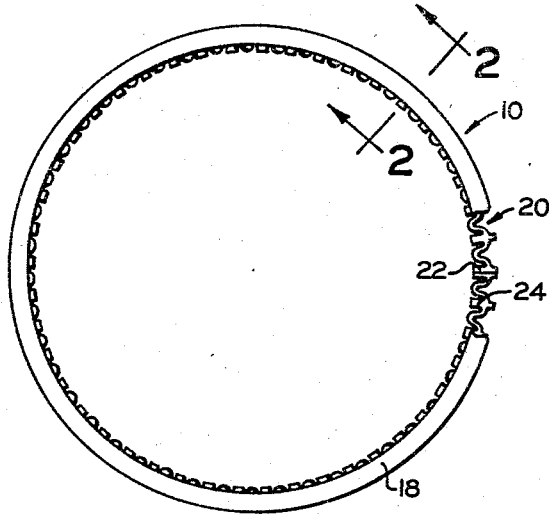
FIG. 1 is a plan view of a piston assembly embodying the features of the invention, with a portion broken away.
Figure 2:
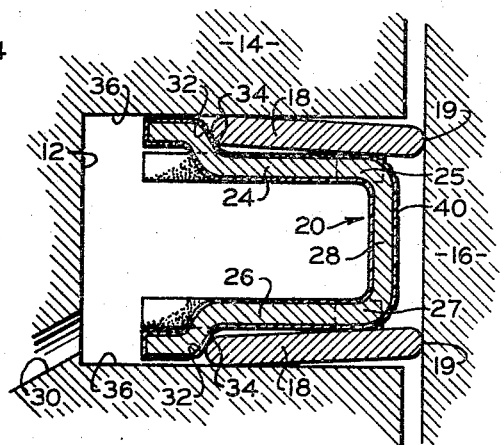
FIG. 2 is an enlarged sectional view taken on the line 2—2 of FIG. 1 and showing the ring assembly mounted in a piston and cylinder.

Referring to the drawings, in FIG. 2, a piston ring according to this invention, indicated generally at 10, is shown mounted in a groove 12 in a piston shown fragmentarily at 14; the piston being located in a cylinder shown fragmentarily at 16. The ring 10 includes a pair of axially spaced cylinder engaging rails 18 and a spacer-expander indicated generally at 20. The rails 18 are of the type usually used in ring assemblies of this general character and are axially relatively thin and flat and extend radially from the groove 12 so that their radially outer peripheries 19 engage the cylinder 16.

Figure 3:
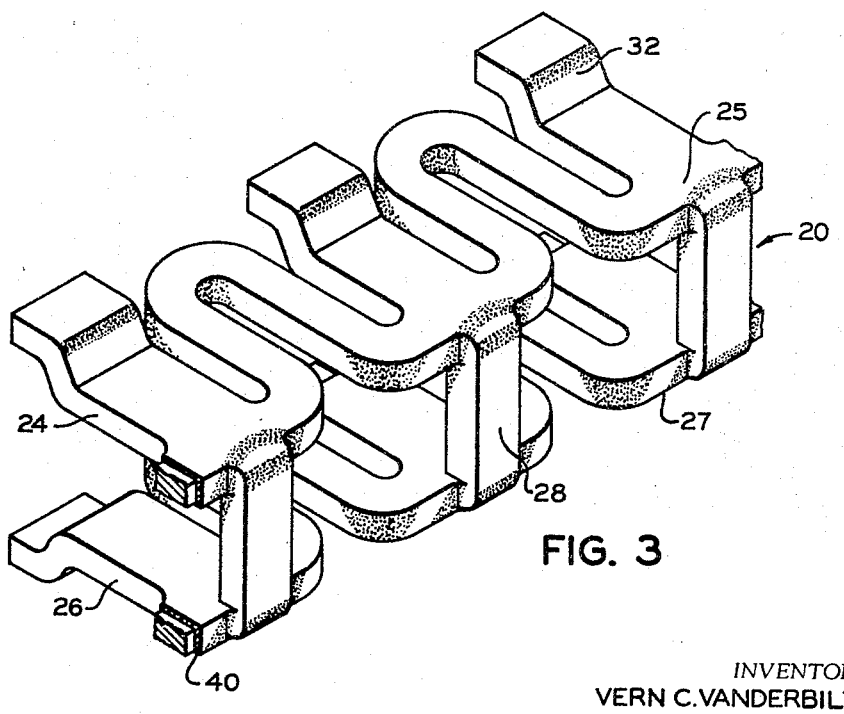
FIG. 3 is an enlarged fragmentary perspective view of the spacer-expander forming part of the ring assembly shown in FIGS. 1 and 2.

The spacer-expander 20 is of the circumferentially compressible and expansible type generally used in ring assemblies. The particular spacer-expander 20 shown in the drawings includes upper and lower circumferentially expansible and compressible spring members 24 and 26 which are axially spaced by a plurality of circumferentially spaced axially extending struts 28 which fixedly interconnect the outer periphery thereof. As clearly seen in FIG. 3, the struts 28 are relatively thin in a circumferential direction so as to provide radially extending openings or spaces therebetween so that lubricant which is scraped from the cylinder 16 by the rails 18 may flow therepast into an opening 30 formed in the groove 12 and leading to the inside (not shown) of the piston where the same can drain into the sump of the engine (not shown). The radially outer portions 25 and 27 of the spring members 24 and 26 engage the inner surface of and axially space the rails 18.

At circumeferentially spaced intervals, the inner periphery of the spring members 24 and 26 are provided with outwardly facing shoulders 32 which are disposed at a radially inwardly and axially outwardly extending angle and engage the inner periphery 34 of the rails 18 thereby urging the rails 18 radially outwardly against the cylinder 16 and axially outwardly against the walls 36 of the groove 12. The spacer-expander 20 is of split annular configuration and the circumferential ends 22 thereof are in abutting engagement. The free length of the spacer-expander 20 is formed so as to be greater than the inner circumference of the rails 18 when the latter are disposed at the diameter of the cylinder 16, so that closing the ring assembly 10 in the cylinder compresses the spacer-expander causing it to exert pressure on the inner periphery 34 of the rails 18 and uniformly forces the latter radially outwardly against the cylinder walls and axially against the groove walls 36. Tension in the spacer-expander 20 is provided independently of the depth of the groove 12 since the spacer-expander does not have to bottom in the groove to be compressed.

In order to reduce the friction at the engagement of the shoulders 32 of the spacer-expander 20 and the inner periphery 34 of the rails 18 and between the outer portion 25 and 27 of the spacer-expander and the rails, to resiliently space the rails 18 and to inhibit the formation of carbonaceous deposits on the spacer-expander which would tend to unitize the ring 10 and inhibit the flow of lubricant past the spacer-expander, the entire surface of the spacer-expander is provided with a relatively thin, hard, tough and resilient coating of polytetrafluoroethylene indicated by the numeral 40. It should be noted that the thickness of the polytetrafluoroethylene coating is greatly exaggerated in the drawings for the purposes of clarity. In actual practice, it has been found that the coating should preferably be applied to a thickness of between .0003 and .0008 inch. When the coating is applied to a thickness less than .0003 inch, it is difficult to insure that the entire spacer-expander is properly coated (it is impossible to have absolutely uniform coverage) and when the coating is applied to a thickness greater than .0008 inch, because of the variations in dimensions and shape of the spacer-expander, it has been found that it is difficult to avoid minute deleterious cracks in the coating.

After an initial cleaning operation in which any rust, grease, organic coatings, dirt or other foreign matter which may be present on the spacer-expander is removed from the surfaces to be coated, the polytetrafluoroethylene may be easily and quickly applied thereto by either spraying or dipping. Such coating application is preferably performed when the spacer-expander is in a continuous coil and before the individual spacer-expanders have been cut to length, the ends 22 thereof are not coated; however, since in assembly the ends 22 abut each other, there is no "surface" at this location.

It has been found most advantageous to apply the polytetrafluoroethylene in the form of a low-viscosity dispersion in a water medium. Such a dispersion may be formed by mixing five pounds of "DuPont Teflon Resin 850–311" with one pound of "DuPont Accelerator VM–7799" and nine ounces of distilled water or multiples thereof in the same proportions. These components are mixed until a uniform dispersion is obtained and the dispersion is then sprayed on the spacer-expander to a thickness of from .0003 to .0008 inch. After the spraying operation, the spacer-expander is placed in an evaporating oven at a temperature of approximately 150° F, until the water is evaporated. After this operation, the polytetrafluoroethylene coated spacer-expanders are baked at a temperature of approximately 700° F. until sintering of the polytetrafluoroethylene coating occurs. Care must be exercised in the spraying, evaporating and sintering operation to avoid, as much as practicable, an uneven, cracked or otherwise disturbed coating.

From the foregoing, it is apparent that the polytetrafluoroethylene coating on the spacer-expander 20 will reduce friction between the spacer-expander and the rails 18 so that the ring 10 may more readily conform to the cylinder 16 and also reduce wear; that the polytetrafluoroethylene coating will provide resilient spacing between the spacer-expander and the rails so that the rails will be resiliently pressed against the walls 36 of the groove 12 and not squeak, and that the polytetrafluoroethylene coating on the spacer-expander will inhibit the formation thereon of carbonaceous deposits.

While only a single embodiment of this invention has been shown and described, it is readily apparent that many changes may be made therein without departing from the scope of this invention as defined by the following claims.

What is claimed is:

1. A piston ring assembly of the multiple component type adapted to be disposed in an annular groove in a piston and adapted to slidably engage a cylinder receiving the piston comprising in combination, an annular split cylinder engaging means adapted to be positioned in the annular groove and slidably engage the same, resilient means for urging said cylinder engaging means outwardly, said resilient means having a portion thereof adapted to engage said cylinder engaging means, and a layer of polytetrafluoroethylene coating at least the portion of said resilient means engaging said cylinder engaging means.

2. A piston ring assembly according to claim 1 wherein the layer of polytetrafluoroethylene is from .0003 to .0008 inch thick.

3. A piston ring assembly according to claim 1 wherein said resilient means has a plurality of radial openings therein for the passage of lubricant, and a layer of polytetrafluoroethylene coats the portion of said resilient means surrounding said openings.

4. A piston ring assembly of the multiple component type adapted to be disposed in an annular groove in a piston, which groove is bounded by axially spaced walls formed in the piston and with the ring assembly adapted to slidably engage a cylinder receiving the piston comprising in combination, an annular split cylinder engaging rail adapted to be positioned in the annular groove and engage a wall thereof, said rail being adapted to have a portion thereof project from the groove and slidably engage the cylinder, resilient means for engaging said rail and biasing the same axially outwardly against the wall and radially outwardly against the cylinder, and a layer of polytetrafluoroethylene coating at least the portion of said resilient means engaging said rail.

5. A piston ring assembly of the multiple component type adapted to be disposed in an annular groove in a piston, which groove is bounded by axially spaced walls formed in the piston, and with the ring assembly having a portion thereof adapted to project radially from the groove for slidably engaging a cylinder receiving the piston comprising in combination, a pair of annular split cylinder engaging rails, said rails being adapted to be disposed in the groove and have the radially outer portion thereof project from the groove so that the outer periphery of the rails is adapted to slidably engage the cylinder, said rails being axially spaced and adapted to engage the walls bounding the groove, an annular circumferentially expansible spacer-expander for axially spacing said rails and for urging said rails axially and radially outwardly, said spacer-expander having a first portion thereof adapted to be disposed between and axially engage said rails for axially spacing the same and a second portion extending substantially axially from said first portion and adapted to engage the inner periphery of said rail for urging said rails axially and radially outwardly into pressing engagement with the walls and the cylinder respectively, said spacer-expander having a plurality of circumferentially spaced radially extending lubricant passages therein, and a layer of polytetrafluoroethylene coating said entire spacer-expander whereby friction is reduced between said portions of said spacer-expander which are adapted to engage said rails and said rails, said rails are resiliently spaced and the build-up of carbonaceous material on the ring assembly is inhibited.

References Cited

UNITED STATES PATENTS

| | | | |
|---|---|---|---|
| 2,807,511 | 9/1957 | Fleming | 277—235 |
| 3,195,905 | 7/1965 | Brenneke | 277—140 |

LAVERNE D. GEIGER, *Primary Examiner.*

D. MASSENBERG, *Examiner.*